United States Patent Office 3,348,395
Patented Oct. 24, 1967

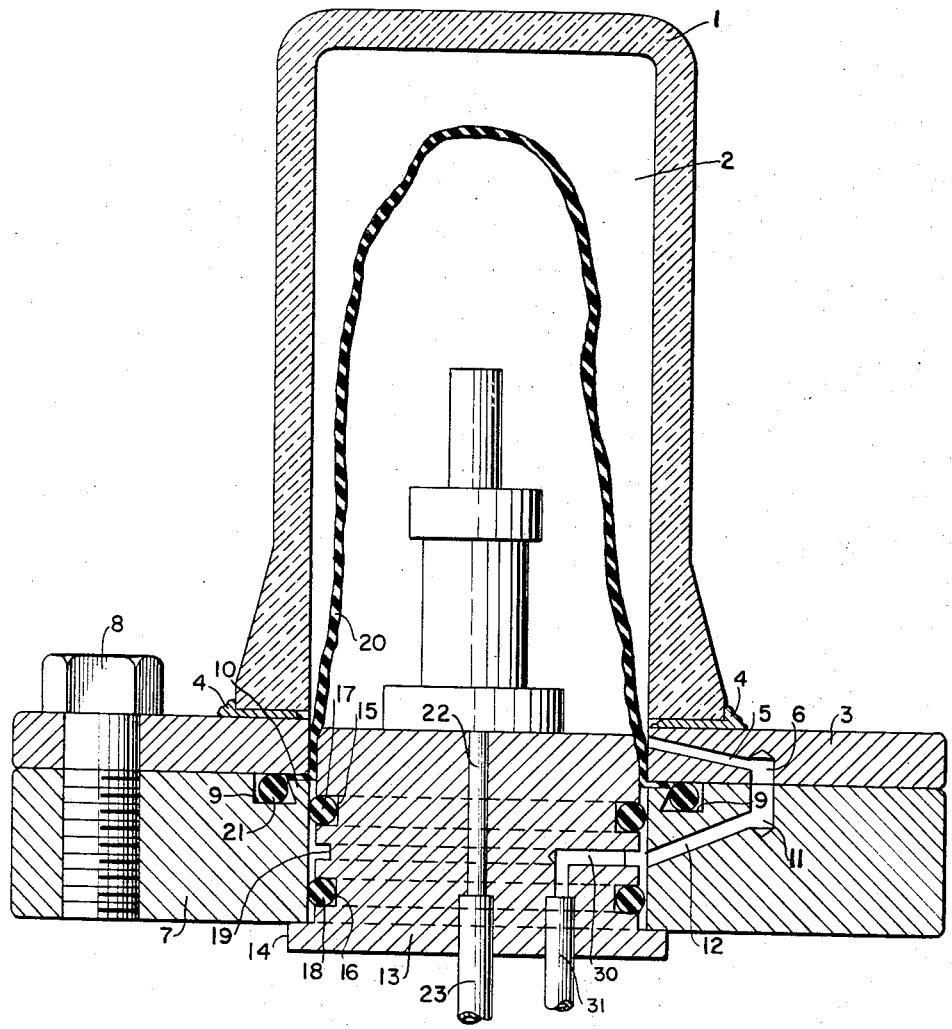

3,348,395
SPECIMEN MOUNTING DEVICE FOR POROSITY DETERMINATION APPARATUS
Clyde Orr, Jr., Atlanta, and Warren P. Hendrix, Lawrenceville, Ga., assignors to Georgia Tech Research Institute, Atlanta, Ga., a corporation of Georgia
Filed Dec. 6, 1963, Ser. No. 511,689
6 Claims. (Cl. 73—38)

ABSTRACT OF THE DISCLOSURE

A specimen mounting device which includes a specimen chamber attached to a base and having its interior continuous with an opening in the base, a flexible bag extending into the specimen chamber and having its lip fixedly attached within the opening in the base, a plug on which a specimen is mounted and which is slideably inserted into the opening in the base to place the specimen within the flexible bag in the specimen chamber, a passage extending from the specimen chamber exterior of the flexible bag through the base and plug, and a passage extending from the interior of the flexible bag through the plug. The device provides for the easy and convenient placing of a specimen within a flexible bag in a specimen chamber for the determination of pore and other volumes by gas displacement techniques.

---

The present invention relates to improvements in porosity measurement apparatus. More particularly, the present invention relates to a specimen mounting device for use in such apparatus.

An apparatus has previously been developed for measuring void and bulk volumes, porosity, and theoretical densities of porous solids by gas displacement techniques. Apparatus of this type is described in Materials Research & Standards, January 1963, vol. 3, No. 1, pp. 20–24, and in co-pending U.S. patent application, Ser. No. 310,196, now U.S. Patent No. 3,309,912.

According to the gas displacement techniques, this apparatus functions to provide for a series of determinations of the volumes of a gas displaced by a specimen of a porous solid material. The first of these determinations is for that volume of a gas which is displaced by the specimen when the gas is prevented from entering the pores of the specimen. This volume of the gas is known as the bulk volume of the specimen. The next determination is for that volume of the gas displaced when the gas is permitted to enter the pores of the specimen and is known as the solid volume of the specimen.

The pore volume may then be determined by subtracting the solid volume from the bulk volume. Further, taking the pore volume and bulk volume one may calculate in a known manner the porosity of the specimen of solid material. Theoretical density may then be computed knowing the weight of the specimen.

In making the determination of bulk volume and solid volume by gas displacement techniques, the specimen must be isolated in a gas-tight environment. Suitable connections must be provided to the environment for introducing and withdrawing a gas and for measuring the volume of the gas by a conventional precalibrated external device. Since one of these determinations requires that none of the gas be allowed to enter the pores of the specimen there must be provided within the environment a means for sealing the specimen on its surface.

Heretofore the specimen mounting devices used in the above-mentioned apparatus have comprised a base having a centrally located pedestal upon which the specimen is supported. A cover member is threadedly secured to the base and provides a chamber around the pedestal and the specimen mounted thereon. Prior to securing the cover member to the base, a gas-tight, elastomeric sleeve must be slipped over the specimen and secured to the pedestal base to thereby prevent gas which is introduced to the chamber from penetrating the pores of the specimen during the bulk volume determination. The usual means for securing the sleeves to the pedestal base has been a rubber O-ring placed under tension.

The base has a vacuum connection communicating therewith for evacuating the chamber of the device and also the core specimen contained within the elastomeric sleeve. In addition, there are gas connections communicating with the base for introducing a gas to the chamber and also to the porous specimen. The gas connections are, of course, connected to the external gas supply and precalibrated volume measuring device.

These specimen mounting devices have proven to be extremely difficult to maintain due to the fact that the elastomeric sleeve requires individual application over the specimen. In addition, there are several external connections which must be contended with to obtain the vacuum and gas supply. Furthermore, and probably most important, the devices have shown tendencies to leak, thereby reducing the reliability of the data obtained.

The present invention overcomes these disadvantages to a great extent by providing a specimen mounting device which eliminates the necessity for individual application of the elastomeric sleeve to the specimen. Moreover, means are provided for securely sealing the interior chamber while rapidly assembling the device with the specimen mounted in place. There is also a reduced tendency to leak thereby providing for reliable data.

Therefore, it is an object of the present invention to provide a novel specimen mounting device for use in porosity measuring apparatus employing gas displacement techniques.

Another object of the present invention is to provide a specimen mounting device for use as described wherein a specimen may be easily and rapidly mounted.

A further object of the present invention is to provide a specimen mounting device for use as described which may be rapidly assembled in an air-tight manner.

Another object of the present invention is a porosity measuring apparatus having a novel specimen mounting device.

These and other objects of the present invention will be apparent from the following discussion and the accompanying drawing wherein there is illustrated a side elevational view in cross section of the novel specimen mounting means.

As shown in the drawing, the specimen mounting device has a cover shell 1 which provides a specimen chamber 2. The shell may have any desirable configuration, however, the cylindrical shape is preferred in most instances. The size of the specimen chamber formed by the shell is desirably just large enough to easily accommodate the test specimens. This avoids a large excess of volume which would lead to the necessity of having cumbersome volume measuring devices. Also, the sensitivity of the volume determinations is maintained at an acceptable level.

The shell is desirably made of a material which is impervious to gases. It is possible, however, to use materials which are substantially impervious to gases wherein any effects on the volume determinations would be negligible. These materials may include glass, coated substrates, and certain metals and plastics.

The shell is mounted at its open end on a sealing plate 3 in a coinciding relationship with an opening in the plate. As shown in the drawing, a sealing wax or polymeric resin 4, which is impervious to gases, is used to mount the shell securely in place. Certain waxes and resins may provide for later separation of the shell from the plate if desired. Other resins may provide a more permanent type of attachment. Moreover, another variation would provide an integral shell and plate made from the same material.

The plate 3 is provided with a passage 5 communicating at one end with the periphery of the opening in the plate and at the other end with a bore 6 extending partway into the plate of the lower surface. The purpose and function of this passage and bore will become apparent from the description to follow of the remaining elements of the device.

A base plate 7 is mounted in sealing engagement with the lower surface of the sealing plate. The two contacting surfaces of the plates may be machined to close tolerances so that sealing engagement may be obtained by merely bolting the plates together, such as by bolt 8 which passes through a hole in plate 3 and is threadedly received in plate 7. Of course, other bolting arrangements may also be employed. Furthermore, a sealing compound or gasket may also be interposed between the surfaces of the plates to insure air tightness.

The base plate 7 has an opening therein of substantially the same diameter as the opening in the plate 3 and is so located as to be in coinciding relationship therewith. On the upper surface of the base plate adjacent the periphery of the opening is a concentric channel 9 for receiving the lip 21 of the elastomeric bag 20 extending up into the specimen chamber 2. The channel is covered over by the lower surface of the sealing plate when the two plates are secured together. The wall 10 separating the channel from the opening in plate 7 is cut slightly lower than the remaining upper surface area of the base plate. In this manner, a portion of the elastomeric bag, specifically that portion which extends from the lip 21 over the wall pin and into the openings through the plates, is compressed between the lower surface of the sealing plate and the upper edge of the wall thereby securing the bag to the speciment mounting device.

Also, in the upper surface of the base plate 7 is a bore 11 extending partway into the plate. This bore is located in such a manner that it communicably coincides with the bore 6 in the sealing plate 3. Communicating with the lower end of the bore 11 is a passage 12 which extends to the internal peripheral surface of the opening in the base plate. Thus, it is apparent that a complete passageway is provided within the base and sealing plate which by-passes the channel 9.

In addition to the above-described apparatus, there is provided a plug member 13 which may be slidably inserted into the openings of the base and sealing plates. For this reason, the plug is of the same configuration as the opening but of slightly smaller dimensions to facilitate its insertion.

The width of the plug member is such that when it is fully inserted the upper portion extends above the interface between the base and sealing plates. Since the elastomeric bag is attached to the device at this interface, the peripheral surface of the upper portion of the plug sealingly compresses the elastomeric bag against the internal surface of the opening in the sealing plate. It should be understood, however, that the passage 5 of the sealing plate opens onto the internal surface of the opening above this region of sealing.

A lower lip on the plug member prevents the plug from being inserted too far into the openings of the base and sealing plates.

Around the periphery of the plug member extend an upper channel 15 and a lower channel 16. Resilient O-rings, 17 and 18, respectively, are seated within these channels and are of such a size as to become sealingly compressed against the internal surface of the opening in the base plate 7 when the plug member is inserted into the openings.

Between the channels 15 and 16, and also extending around the peripheral surface of the plug member 13, is a third channel 19. As shown in the drawing, passage 12 in the base plate 7 opens onto the internal surface of the opening between the channels 15 and 16 to thereby communicate with the channel 19. Also, communicating with channel 19 is an elbow passage 30 contained within the plug member. This passage extends to an external fitting 21 on the lower surface of the plug for receiving either a gas or vacuum connection.

Thus, it will be understood that vacuum may be drawn or gas supplied to the space within the specimen chamber 2 that is external of the elastomeric bag 20. Suitable external controls for accomplishing this under controlled conditions will be apparent from reference to co-pending U.S. application, Ser. No. 310,196, now U.S. Patent No. 3,309,912.

The space within the specimen chamber that is internal of the elastomeric bag is provided with either vacuum or a gas by a separate passage 22 which also is contained within the plug member 13 and has an external fitting 23.

Preferably, the fittings 31 and 23 are interconnected with each other as well as to a source of vacuum and a combination gas supply-volume determination device such as that described in the above-mentioned co-pending application. Suitable valving for the specimen mounting device will be apparent to those skilled in the art.

In operation, the plug member 13 is withdrawn from the openings of the base plate and sealing plate and the specimen of porous solid material is placed on its upper surface. The plug and specimen are then easily reinserted into the openings whereby the specimen is positioned within the elastomeric bag and the plug sealingly engages the internal peripheral surfaces of the openings. The gas and vacuum passages inherently line up and the specimen is ready for the volume determinations.

These volume determinations are performed in the same manner as described in co-pending U.S. patent application, Ser. No. 310,196, now U.S. Patent 3,309,912. The device is first calibrated against a standard using the combination gas supply-volume determination unit. The specimen is then inserted into the device wherein it is positioned within the bag. The specimen chamber 2, including the spaces inside and outside the elastomeric bag, is evacuated along with all of the passages. A known quantity of gas is then admitted to the space outside of the elastomeric bag but within the chamber 2 and the bulk volume is determined. Without allowing any of this known volume of gas to escape from the device the gas is allowed to enter the space inside the elastomeric bag where the specimen is contained. The gas fills the pores of the specimen and the solid volume of the specimen is then determined.

From this data the pore volume of the specimen may be easily computed along with the porosity and theoretical density when the specimen weight is known.

Thus, having described the present invention it should be apparent that a specimen mounting device for porosity determination apparatus has been provided which is easy to manipulate while having substantially no tendency to leak whereby reliable data may be obtained. It will also be apparent that various modifications may be made without departing from the spirit and scope of the present invention which is to be limited only by the appended claims.

What is claimed is:
1. In a specimen mounting device for use in determining the volume of a specimen, a substantially air tight specimen chamber, a base attached to said specimen chamber and having an opening therethrough communicating with said specimen chamber, a flexible bag fixedly attached to said base within said opening and extending into said specimen chamber, a specimen mounting plug slideably inserted into said opening, a first passage means extending through said base and said plug for communicating with said specimen chamber external to said flexible bag, a second passage means extending through said plug for communicating with said flexible bag, and means for connecting both said first passage means and said second passage means to a measuring means for measuring gas pressure.

2. The device of claim 1 in which the base comprises an upper sealing plate on which the specimen chamber is mounted and a lower base plate and in which the flexible bag is fixedly attached by clamping its lip between the two plates.

3. The device of claim 2 in which the first passage means includes a U-shaped passage formed within both the sealing plate and the base plate and communicating at one end with one end of a passage formed within the specimen mounting plug.

4. The device of claim 3 in which the specimen mounting plug is sealingly secured within the opening in the base by two resilient O-rings riding within peripheral channels surrounding the plug, said channels being positioned on opposite sides of said one end of a passage formed within the specimen mounting plug.

5. The device of claim 1 in which said first passage means includes a channel extending around the peripheral surface of said plug.

6. The device of claim 5 in which O-rings are positioned between said base and said plug above and below said channel.

References Cited
UNITED STATES PATENTS 2,667,782  2/1954  Shea.
3,309,912  3/1967  Boland et al. _____ 73—38

LOUIS R. PRINCE, *Primary Examiner.*

W. HENRY, *Assistant Examiner.*